H. E. HAWES.
AIRCRAFT AND ITS MANAGEMENT.
APPLICATION FILED OCT. 19, 1920.
1,435,136.
Patented Nov. 7, 1922.
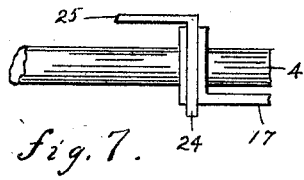
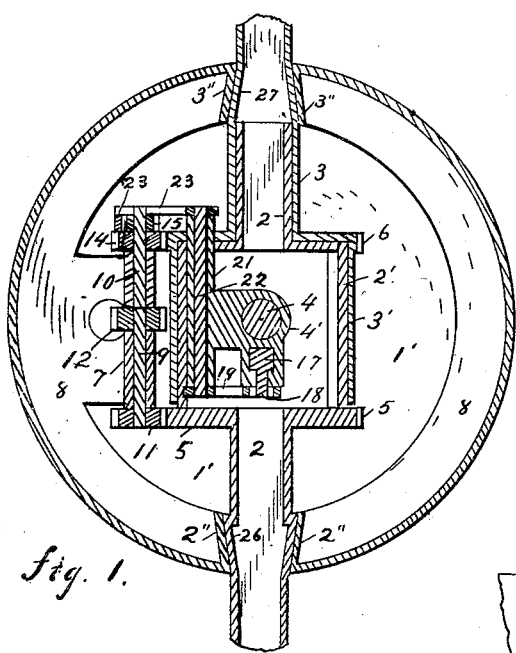
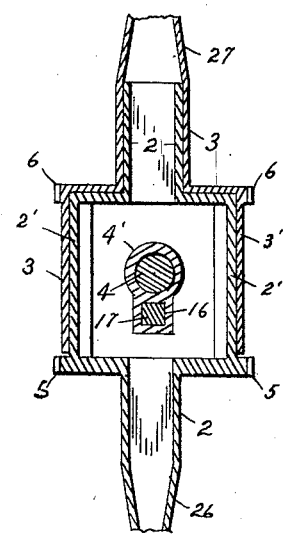
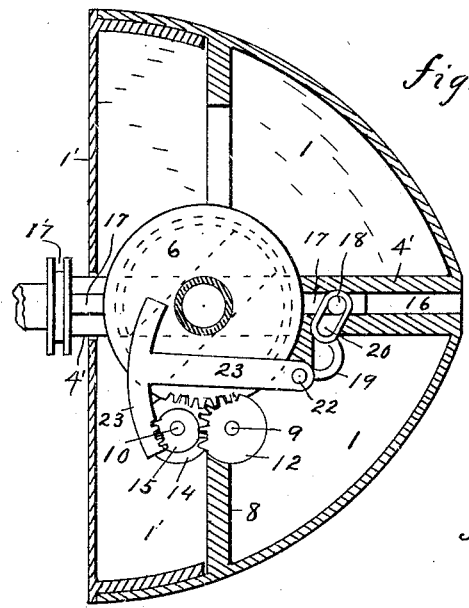
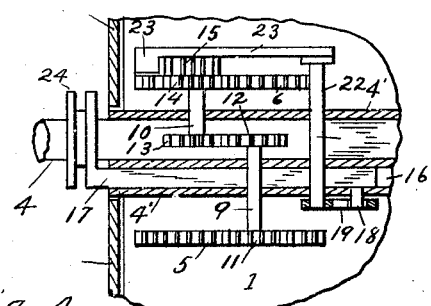
INVENTOR
Herbert E. Hawes

H. E. HAWES.
AIRCRAFT AND ITS MANAGEMENT.
APPLICATION FILED OCT. 19, 1920.

1,435,136.

Patented Nov. 7, 1922.
3 SHEETS—SHEET 2.

INVENTOR
Herbert E. Hawes

H. E. HAWES.
AIRCRAFT AND ITS MANAGEMENT.
APPLICATION FILED OCT. 19, 1920.
1,435,136.
Patented Nov. 7, 1922.
3 SHEETS—SHEET 3.
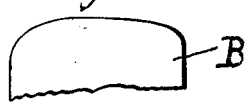
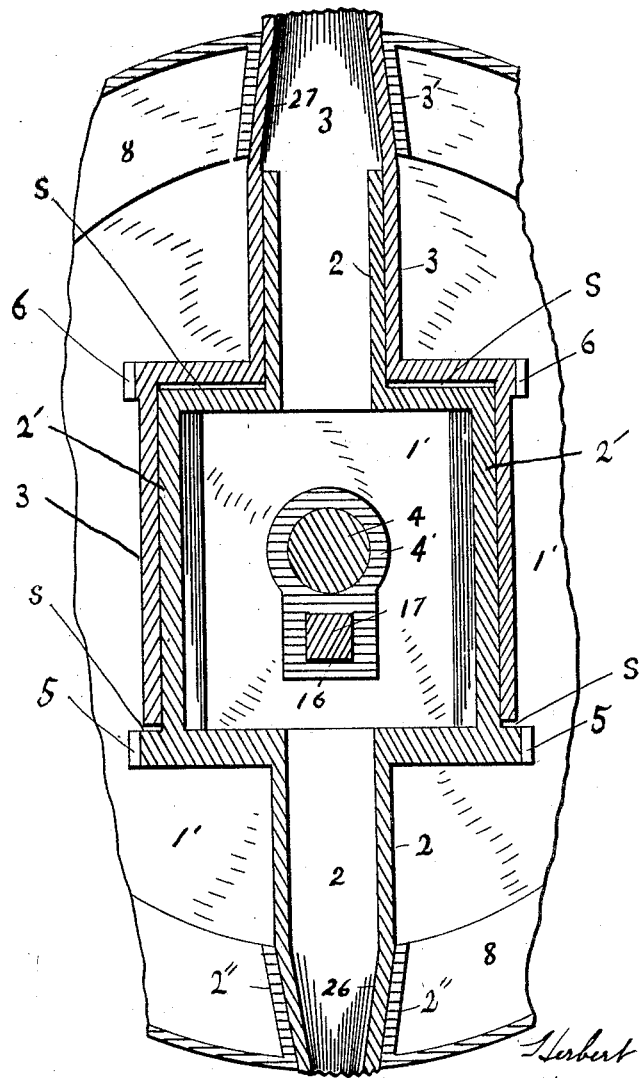
INVENTOR
Herbert E. Hawes
BY his ATTORNEY Patented Nov. 7, 1922.

1,435,136

UNITED STATES PATENT OFFICE.

HERBERT E. HAWES, OF BROOKLYN, NEW YORK, ASSIGNOR OF THIRTY ONE-HUN-DREDTHS TO WALTER D. EDMONDS, OF BOONVILLE, NEW YORK.

AIRCRAFT AND ITS MANAGEMENT.

Application filed October 19, 1920. Serial No. 417,894.

*To all whom it may concern:*

Be it known that I, HERBERT E. HAWES, a citizen of the United States, and a resident of Brooklyn, in the county of Kings, State of New York, have invented certain new and useful Improvements in Aircraft and Their Management, of which the following is a specification.

My present invention relates to aircraft and more particularly to the propeller thereof, and its objects comprise provision of means to quickly, surely, evenly and synchronously incline the blades from zero to any practical working angle.

Another object is to avoid vibration of the blade shafts.

Another object is to provide means by which the blades automatically lock and hold their adjustment after being set manually at any angle.

I accomplish these objects by the peculiar formation, disposition and arrangement of the several parts of my novel propeller device, reference being had to the drawings accompanying and forming a part of this specification, in which like reference numerals denote like parts in all the views.

In the drawings:

Fig. 1 is a front elevation of the blade-carrying shell, showing, diagrammatically, several parts thereof in section.

Fig. 2 is a plan view, showing, diagrammatically, the cone in central section, and the location and arrangement of the blade shafts and their inclining gear, and its actuating mechanism.

Fig. 3 is a detail of the blade-carrying shafts, and their axial enlargement cut away to allow for the passage of the motor shaft therethrough.

Fig. 4 is a detail, in side elevation, of the blade inclining gear train, and its actuating mechanism.

Fig. 5 is a side elevation of the front part of a fuselage, having my propeller reversing mechanism applied thereto.

Fig. 7 is a detail of the connection between the gear train and the cock pit.

Figure 10 is a fragmentary central sectional detail view of the parts of the blade-carrying shafts and of the whole of their axial enlargements such as shown in Fig. 3, but on considerably enlarged scale so as to more clearly show their hereinafter described longitudinal reciprocatability, this figure showing also diagrammatically the tip of a blade, intervening parts being broken away.

Figures 6, 8, 9:
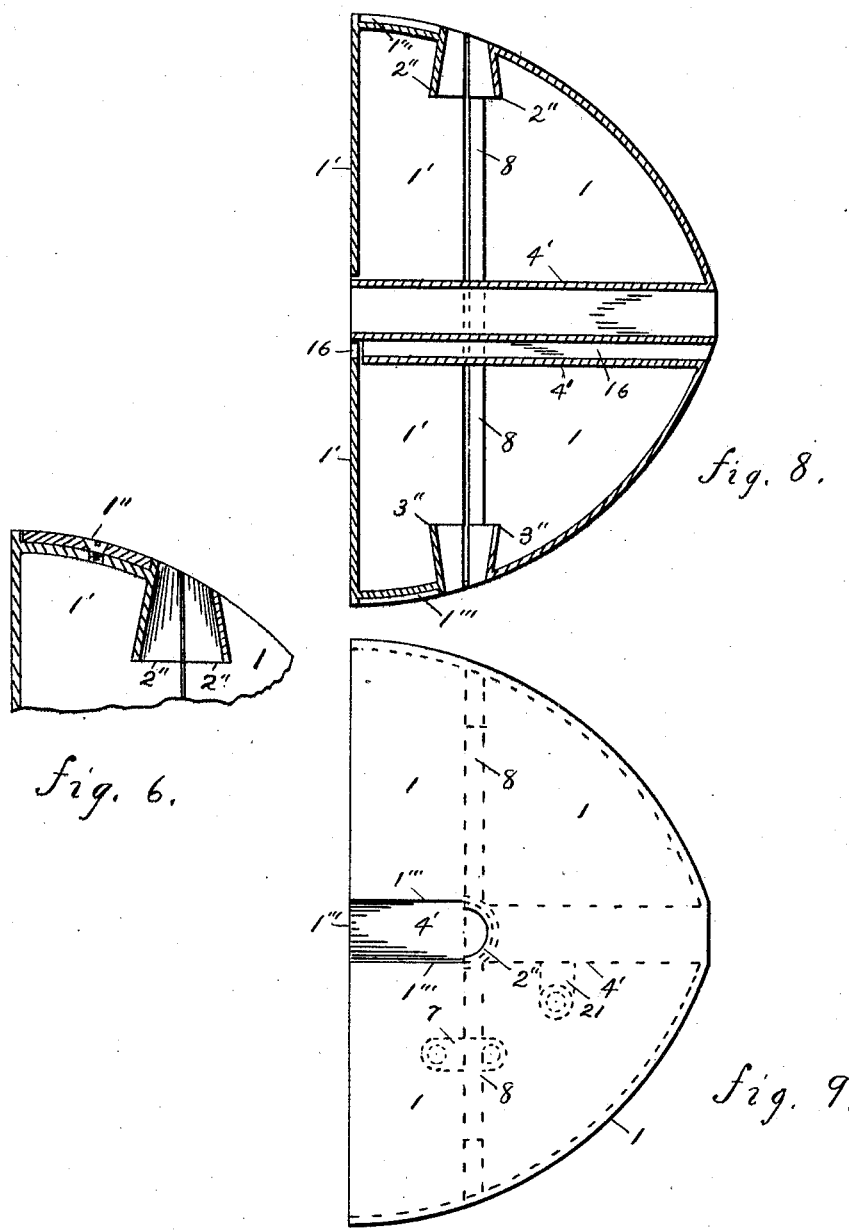
Fig. 6 is a detail, in section of one of the blade shaft bearings.
Fig. 8 is a central vertical section of the supporting shell.
Fig. 9 is a plan of the same, showing the sections of shell cut away for introduction of the blade shafts.

In reducing my invention to practice:

I make use of a, preferably, conoid shell, or frame, 1, having partly cylindrical oscillatable, oppositely-disposed and radially extending propeller blade-carrying shaft-members 2 and 3 mounted rotatively therein, and having integral conical shaft bearings 26 and 27, where they contact with the therewith cooperative female conical bearings 2″ and 3″ carried by the frame.

Said frame or case is provided with an integral axial sleeve 4′ for the reception of the power shaft 4, which traverses, or passes transversely entirely across, the case and upon which said case is firmly mounted in any well-known way; whereby opposite sides of the case, i. e. the front and back thereof, equally bear upon or are supported by the power shaft. The power shaft itself is thus made to extend crosswise of said shafts 2 and 3 which telescope inside case 1, each being telescoped with the other on two different sides of the power shaft and, where they pass or extend, crosswise of the power shaft are each enlarged into a hollow cylinder 2′—3′; 2′ denoting the cylindrical part of the inner shaft and 3′ of the outer shaft and these cylindrical parts of the shafts are likewise telescoped. I cut segmental sections from opposite sides of said cylinders, to allow for the passage of shaft 4 and its sleeve 4′ therethrough, and sufficiently large to accommodate preferably, a 90° oscillation of said blade shafts. As said shafts extend nearly across the inside of case 1, there is a portion of said shaft 2, on opposite sides of cylinder 3′ and, of smaller diameter than the cylinder, which lies inside shaft 3. On the outside of each of said members 2′—3′, I form like spur gears 5—6, respectively, which connect with a gear train for varying the incidence of the blades carried by the shafts 2—3. Said shafts are made to have a snug working fit upon each other, as also are their respective cylindrical enlargements 2′—3′. On a rib 8, extending relatively to the power shaft 4 around the inside of the case 1 and integral therewith, I form a bearing bracket 7, (Figs. 1 and 8) having two parallel shaft bearings therein located at right angles to shaft 4. In the one of said bearings nearer the apex of the case, I mount a secondary shaft 9, (Figs. 1, 2 and 4) having rigidly mounted on the opposite ends thereof like spur gears 11—12. Gear 11 lies in the same plane as and connects with the gear 5 on cylinder 2′.

In the other secondary bearing, I mount a shaft 10, having on one end a gear 13 meshing with gear 12 on shaft 9, and on its opposite end a gear 14 meshing with gear 6 on shaft 3 (Fig. 4). On shaft 10, next to and above gear 14, I mount a secondary driving gear 15 connecting with the manually actuated means for oscillating said shaft to incline the blades. Thus it will be seen that oscillation of shaft 10, through the connected train, will oppositely incline the blade-carrying shafts 2—3.

To vary the inclination of the blade-carrying shafts, I use the following instrumentalities:

In one side of the shaft sleeve 4′, I form a rectangular slide 16 parallel therewith, and in which is slidably mounted a square rod 17 one end of which is provided with a transverse stud 18, engaging with slot 20 in lever 19 (Figs. 2, 3 and 4).

In a bearing 21, and extending transversely thereto and on one side of sleeve 4′, is mounted oscillatively, a shaft 22, upon the lower end of which (Fig. 4) is rigidly mounted said lever 19. Shaft 22 lies parallel with the blade-shafts 2—3 and beside cylinders 2′—3′, and extends past the same to a plane radial with gear 15 on shaft 10. On the outer end of shaft 22 is rigidly affixed a segmental internal gear 23, and engaging with gear 15 on shaft 10. It will be readily seen that rod 17 might be provided with a rack on one side thereof and meshing directly with gear 11 on shaft 9, but to reduce the axial reciprocation of rod 17, I make use of the multiplying function of segmental gear 23. Thus it will be seen that reciprocation of the rod 17 in either direction, through lever 19, shaft 22 and the reverse gear train, will oppositely incline the blades on shaft 2—3.

Rod 17 extends through the rear base cap 1′ and terminates in a grooved raceway 17′ (Fig. 2), surrounding, and slidably and concentrically mounted upon, shaft 4 at the rear.

In and surrounding groove 17′ is mounted a nonrotatable ring 24, having an actuating rod 25 connected thereto (Fig. 7), and extending to within reach of the aviator, which, on account of the different shapes of aeronautical motors, may be provided with the necessary joints, offsets, or bends to reach said position. Integral with wall 8 are formed the oscillatory shaft bearings 2″—3″. Upon shafts 2—3 where they contact and pass through the outer shell of case 1, are formed outwardly tapering male conical bearing members 26—27. These bearings resist the centrifugal stress of said shafts, and also serve to arrest the lateral vibration thereof, as the centrifugal force imparted to the shafts by rotation of the power shaft serves to seat them therein all the more firmly, and make the shafts act temporarily as one solid piece with the frame. Said conical bearings are of such taper as will automatically release shafts 2—3 therefrom; on cessation of the engine power, and enable them to be oscillated under influence of the inclining gear.

As the shafts 2—3 have to be put into case 1 assembled and telescoped, I make the back 1′ thereof removable. This leaves frame 1 with two opposed longitudinally cut away sections 1‴, extending from the rear to the center line of the blade shafts, and the one half of bearings 2″—3″ integral therewith (Figs. 8, 9); the inwardly extending part 1′ fitting into and inside frame 1 and suitably secured thereto by screws 1″ (Fig. 6). Said back 1′ has a central concentric bore fitting snugly upon the rear end of sleeve 4′ to help support the same and hold it concentric therewith.

Thus the assembled blade shafts are first slipped into place over shaft 4, and gears 5—6 adjusted into proper mesh with gears 11—14, the rear cap 1′ is then assembled in register therewith and with the frame or case 1 and these properly bolted together, and the fixture is then ready to be mounted on shaft 4, in any well known manner; as by shrinking, driving, or screwing on by a nut at the forward end. The central bore for shaft 4 may be made with a rearwardly enlarging taper at option, and the member 24 may be supplied with ball thrust bearings, where it engages with groove 17′, without departing from the spirit of the invention.

As follows from the foregoing description, my novel propeller device comprises in combination with the usual rotatory power shaft a plurality of axially oscillatable propeller-blade-bearing shafts which are to a small extent longitudinally reciprocatable, that is to say forcible outwardly by centrifugal action, and somewhat movable inwardly when rotation of the power shaft is diminished or stopped thereby relaxing or terminating the outward centrifugal pressure, the extent of my novel longitudinal reciprocability of the shafts required for my present purposes being only a fraction of an inch (see S. S. Fig. 10) obviously readily provided for by, if indicated, correspondingly dimensioning the gear faces 5—6—11 and 14, so as to maintain sufficient tooth bearing and the said blade-bearing shafts are carried in the frame and by dispositions relatively radial to the power shaft. Other important features of my invention are my novel bearings for the blade-carrying shafts, these comprising a conical female bearing carried by the frame and a therewith cooperating outwardly tapering conical male bearing carried by the blade-carrying shaft. Another important feature is the partly cylindrical character of my blade-bearing shafts and their mutual telescoping with each other, the latter providing for the above referred to and preferable longitudinally reciprocative property of the shafts, and the local enlargement in diameter of the shaft considered as a whole imparted by shaping a portion thereof in the form of a cylinder of greater radius than the remainder, or equivalently by having the shaft carry concentrically therewith a cylindrical member of such greater radius, affords opportunity for leverage without which oscillation of the blade-bearing shafts, when firmly seated in their aforesaid bearings, would be difficult, if not impossible; moreover, the referred to construction contributes indispensably, as I at present believe, to the strength and stability, and to the synchronism and ease of oscillation, of the shafts, this being largely attributable to each of the blade carrying shafts being telescoped with the other, and thus contributing to each other's mutual support, on opposite sides of the power shaft.

Having now described my invention, what I claim as new and desire to secure by Letters Patent is the following, viz:

1. In an aircraft, a propelling device comprising a rotatory power-shaft; a frame rigidly secured thereto; a pair of propeller-blade-carrying members, or shafts, having outwardly tapered bearings cooperative with correspondingly tapered journals or bearings therefor carried by said frame, and means to oppositely partially rotate said last mentioned shafts in unison with each other while the power shaft is rotating.

2. In an aircraft, a propelling device comprising a rotatory power shaft; a frame rigidly secured thereto; a longitudinally reciprocatable blade-carrying shaft-member, extending from within to outside of the frame and having an outwardly tapering male bearing; a female bearing carried by the frame cooperatively with said male bearing; means to rotate the power shaft; and means to simultaneously axially oscillate the blade-carrying shaft-member.

3. In an air-craft, a propelling device comprising a rotatory power shaft; a frame carried and traversed thereby; a blade-carrying shaft-member axially oscillatably journalled in the frame to one side of, and extending crosswise of, the power shaft; and means disposed to another side of said power shaft to there also oscillatably support said blade-carrying-shaft member.

4. In an air-craft, a propelling device comprising a rotatory power shaft; a frame carried and traversed thereby; a pair of oppositely-from-each-other-extending blade-carrying shaft members each axially oscillatably journalled in one of two opposite sides of the frame each extending to opposite sides of the power shaft, and each telescoped with the other on two opposite sides of the power shaft.

5. In an aircraft, a propelling device comprising a rotatory power shaft; a frame rigidly secured thereto; means to rotate the power shaft; a pair of oppositely longitudinally reciprocatable and axially oscillatable blade-carrying shafts each carrying within the frame a therefrom radially enlarged extension, the said extensions being simultaneously rotarily oscillatable in opposite directions around the line of the axes of said blade-carrying shafts.

6. In an aircraft, a propelling device comprising a rotatory power shaft; a frame rigidly secured thereto; means to rotate the power shaft; a pair of mutually telescoped, oppositely longitudinally reciprocatable, and axially oscillatable blade-carrying shafts, each carrying within the frame a hollow cylinder of greater radial diameter than the blade-carrying shaft, the said cylinders being also mutually telescoped; and means inactuated by the power shaft to simultaneously axially oscillate in opposite directions each of said hollow cylinders.

7. In an aircraft, a propelling device comprising a rotatory power shaft; a frame rigidly secured thereto; means to rotate the power shaft; a pair of mutually telescoped, oppositely longitudinally reciprocatable, and axially oscillatable blade-carrying shafts, each carrying within the frame a hollow cylinder of greater radial diameter than the blade-carrying shaft, the said cylinders being also mutually telescoped; a gear carried peripherally by each cylinder; gears coacting with said gear; and means to, from outside of said frame, rotarily oscillate all of said gears during rotation of the power shaft and longitudinal movements of the blade-carrying shafts.

8. In an aircraft, a propelling device comprising a rotatory power shaft; a frame detachably secured thereto and comprising an exteriorly conoidal forward section and a therefrom detachable rear section; means to rotate said shaft; a pair of mutually telescoped propeller-blade-carrying members, or shafts, having also mutually telescoped enlargements, rotatably carried within said frame and each extending to, and around, said power shaft which passes therethrough, and means to oppositely partially rotate said last mentioned shafts in unison with each other while the power shaft is rotating.

9. In an aircraft, a propeller device comprising a rotary power-shaft; a frame rigidly secured thereto; means to rotate the power-shaft; a propeller-blade-carrying member, or shaft, longitudinally movably and axially oscillatably carried by the frame; and means to oscillate the blade-carrying shaft while it is moving longitudinally during rotation of the power shaft.

10. In an aircraft, a propeller device comprising a rotatory power-shaft; a frame rigidly secured thereto; means to rotate the power-shaft; and a propeller-blade-carrying member, or shaft, longitudinally movably and axially oscillatably carried by the frame.

11. In an aircraft a propeller device comprising a rotatory power shaft; a hollow conoid blade-shaft carrying frame affixed thereon; opposite radially disposed conical female blade-shaft bearings having outwardly diminishing bores, or journals; a blade-carrying shaft member mounted rotatively in each bearing each extending crosswise of the power shaft, each telescoped with the other on two opposite sides of the power shaft between it and said bearings and each having thereon correspondingly tapered male bearings coacting with said female journals, or bearings; manually actuated blade-oscillating mechanism engaging each shaft at a greater radial distance from the axis of the blade-carrying shaft-member than is located the outermost surface of its said male bearing; and means for simultaneously oscillating said blade-carrying shaft oscillating mechanism while the power shaft is in rotation.

12. In a propelling device a rotatory power shaft; a blade-shaft supporting frame mounted thereon and having radially extending oppositely located tapering bearings therein; a pair of oppositely extending axially oscillatable, radially disposed, blade-carrying shafts mounted in said bearings, and having medially disposed transverse openings through which said power shaft transversely thereof extends; blade-shaft oscillating mechanism engaging each shaft on opposite sides of said openings and power shaft and actuated from a common prime-mover or gear; and manually actuated means for putting in action said blade oscillating mechanism.

13. In a propelling device a rotatory power shaft; a thereby carried blade-supporting member or frame, having opposed radial shaft bearings therein; a pair of oscillatable blade-carrying shafts respectively journalled in each of said bearings each extending crosswise of the power shaft and each telescoped with the other on two opposite sides of the power shaft between it and said bearings; a propelling blade carried by each of the said shafts outside of said frame; and means to oppositely equally and simultaneously oscillate said blade-carrying shafts while so supported and while the power shaft is rotating.

14. In a propelling device, a rotatory power shaft having a hollow conoid blade-supporting member affixed thereon and rotated thereby and having a pair of oppositely radially extending blade-shaft supporting bearings located in the outside wall of said conoid support; a blade-carrying shaft oscillatably mounted in each of said opposed bearings and so formed as to extend transversely of the axis of said power shaft and be supported on one side of the power shaft by said radial cone bearing and on the other side of the power shaft by telescoping with the thereto oppositely disposed other blade-bearing shaft; each of said blade-carrying shafts having affixed to the end thereof outside of the cone support a propelling blade.

15. In an aerial propelling device a rotatory power shaft; means to rotate it; a hollow frame mounted rigidly thereon; oppositely extending radially disposed blade-carrying shafts axially oscillatively and longitudinally reciprocatably mounted in and mutually telescoped on two opposite sides of the power shaft within said frame; and manually actuated means to bi-directionally simultaneously oscillate said blade carrying shafts to vary the inclination and incidence of the blades.

HERBERT E. HAWES.

Witness:
W. J. HOPKINS.